June 24, 1947.  H. H. MERWIN  2,423,038
ASSEMBLING APPARATUS
Filed May 10, 1944  6 Sheets-Sheet 2

FIG. 2

INVENTOR
H. H. MERWIN
BY E.R. Nowlan
ATTORNEY

June 24, 1947. H. H. MERWIN 2,423,038
ASSEMBLING APPARATUS
Filed May 10, 1944 6 Sheets-Sheet 3

INVENTOR
BY H. H. MERWIN
E. R. Nowlan
ATTORNEY

June 24, 1947.　　　　H. H. MERWIN　　　　2,423,038
ASSEMBLING APPARATUS
Filed May 10, 1944　　　　6 Sheets-Sheet 5

INVENTOR
BY H. H. MERWIN
E.B.Nowlan
ATTORNEY

June 24, 1947.　　　　H. H. MERWIN　　　　2,423,038
ASSEMBLING APPARATUS
Filed May 10, 1944　　　　6 Sheets-Sheet 6

INVENTOR
H. H. MERWIN
BY
*J. H. B. Whitfield*
ATTORNEY

Patented June 24, 1947

2,423,038

UNITED STATES PATENT OFFICE 2,423,038

ASSEMBLING APPARATUS

Harry H. Merwin, Rutherford, N. J., assignor to Western Electric Company, Incorporated, New York, N. Y., a corporation of New York Application May 10, 1944, Serial No. 534,967

9 Claims. (Cl. 218—0.5)

This invention relates to assembling apparatus, and more particularly to apparatus for assembling terminals in articles.

An object of the invention is to provide an apparatus which is simple in structure, automatic in operation, and highly efficient in assembling articles.

With this and other objects in view, the invention comprises a locating element actuable with respect to a supply of parts to receive a plurality of parts in a given order, associated means to transfer the parts to a chuck, where an article may be disposed thereon, and means actuable relative thereto to secure the parts to the article.

Other objects and advantages will be apparent from the following detailed description when considered in conjunction with the accompanying drawings, wherein.

Referring now to the drawings, it is believed that from a broad description of what takes place during the operation of the apparatus, the more specific and detailed description may be more readily understood.

Figure 3:
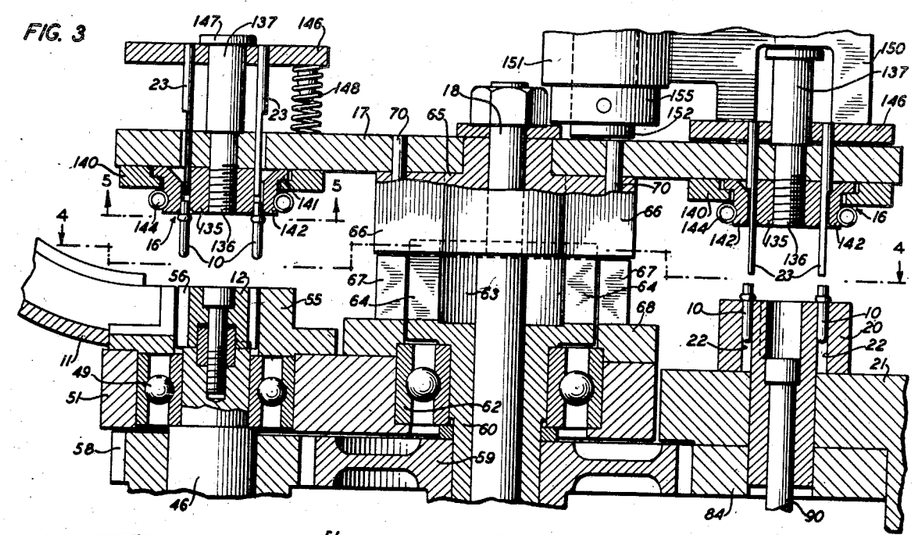
Fig. 3 is a fragmentary vertical sectional view of a portion of the structure shown in Fig. 2, parts thereof being shown, however, in different positions, the section line in some parts not entirely coinciding with section line 2—2.
Figure 4:
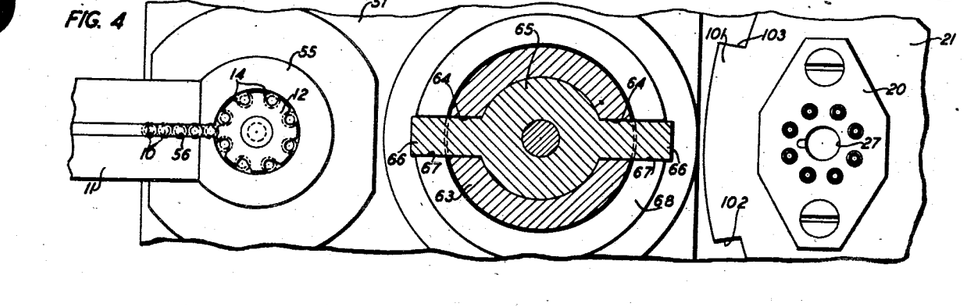
Fig. 4 is a fragmentary sectional view taken substantially along the line 4—4 of Fig. 3.
Figure 5:
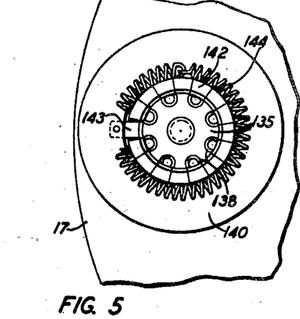
Fig. 5 is a fragmentary detail view taken along the line 5—5 of Fig. 3, with the terminals removed.
Figures 9, 10, 11:
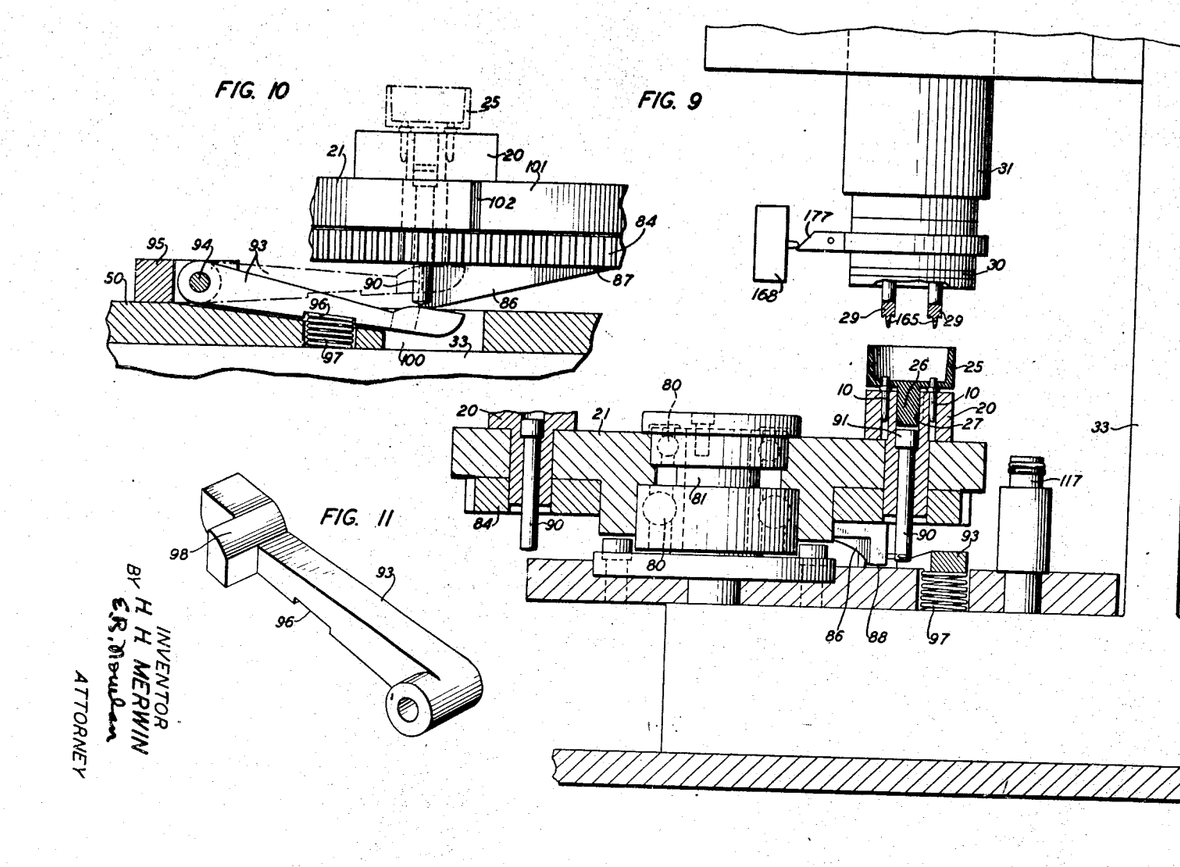
Fig. 9 is a fragmentary vertical sectional view taken substantially along the line 9—9 of Fig. 1, with portions shown in this figure which were removed from Fig. 1.
Fig. 10 is a fragmentary sectional view taken along the line 10—10 of Fig. 1.
Fig. 11 is a perspective view of the ejecting lever shown in Fig. 10.

In this embodiment of the invention hollow metallic terminals 10, as shown in Figs. 3, 4 and 9, are fed by gravity down a chute 11 to a locating or positioning element 12 which is intermittently rotated one complete revolution to receive a given number of the terminals 10, depending upon the number of pockets 14 in the peripheral wall thereof. As illustrated, the element 12 is provided with eight pockets, and eight terminals 10 will be received from the chute 11 during the revolution or complete cycle of the element 12. After the terminals have been received by the positioning element 12, a chuck, indicated generally at 16, will be moved downwardly to grip the terminals in their definitely spaced positions and remove them from the locating element, as illustrated in Fig. 3. A chuck 16 is disposed at each end of a transfer arm 17, which, during a portion of the operating cycle of the apparatus, is moved on its supporting rod 18 one-half revolution, to position the group of terminals above a chuck or holder 20 of a dial or turntable 21. After this has been accomplished, the transfer arm is moved downwardly to locate the terminals in spaced apertures 22 of the chuck 20, ejecting pins 23 being provided for each of the terminals to eject them from the chuck 16 during a subsequent upward movement of the arm 17 and thus cause them to remain in the chuck 20.

Figure 1:
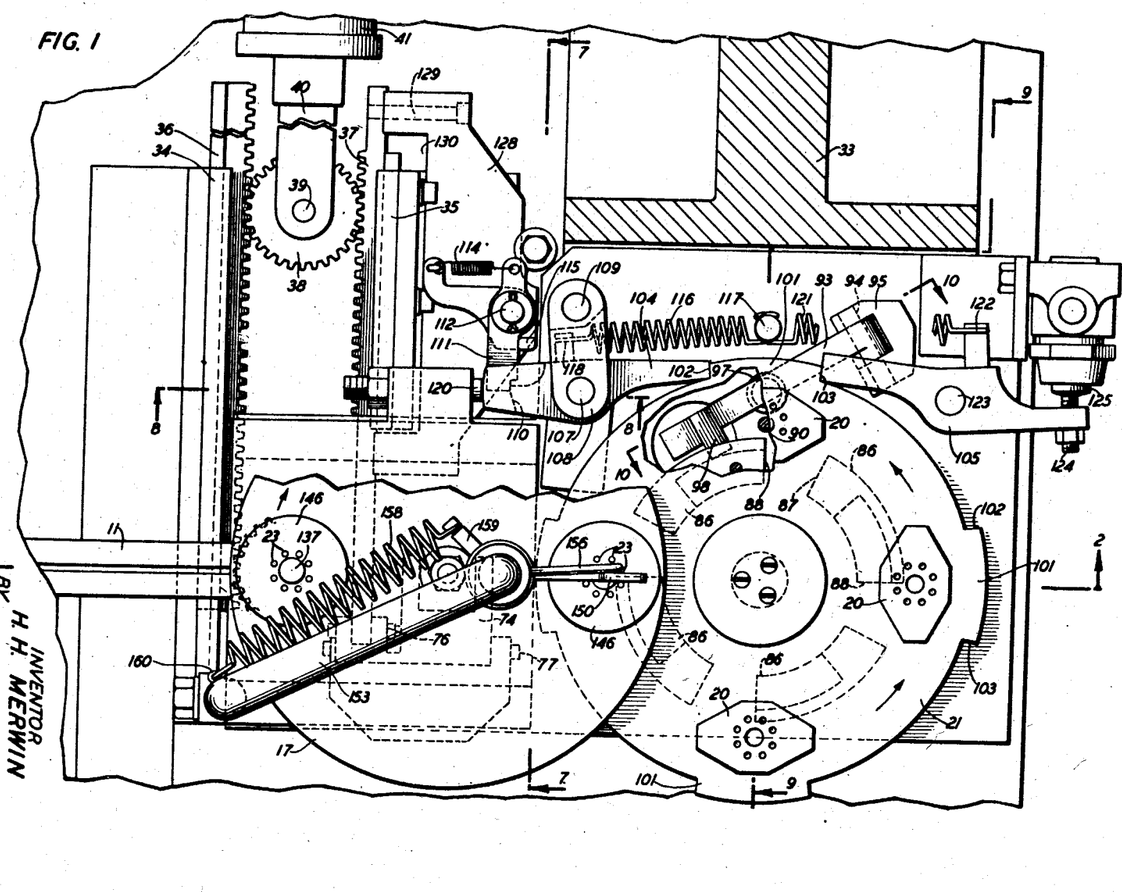
Fig. 1 is a fragmentary top plan view of the apparatus, portions thereof being removed.

As illustrated in Fig. 1, there are four chucks 20 disposed at equally spaced positions about the dial 21, one being hidden by the transfer arm or dial 17. The dial 21 is rotated one-quarter of a revolution during each one-half revolution of the transfer arm 17 and during each complete revolution of the locating element 12. Attention is directed to the fact that the upsetting mechanism is 90 degrees back of the terminal receiving station. Therefore, after the first mentioned chuck 20 receives the set of terminals, the operator is given the next two cycles of operation of the apparatus, that is, the next two intermittent movements of the dial 21, in which to place an article, namely a base 25 of a vacuum tube, on the terminals in the chuck 20, as illustrated in Fig. 9. The base 25 includes a central stem portion 26 adapted for interfitting engagement in a central aperture 27 of the chuck 20, the base also having definitely spaced apertures in the bottom portion thereof to receive the upper ends of the hollow terminals 10. At the fourth position of the dial 21, the terminals and the base 25 to which they are to be secured, are moved in the chuck 20 beneath a set of forming tools 29, the latter being equal in number to the terminals 10 and disposed at like spaced positions relative to a tool holder 30. The tool holder 30 is actuated through a double-acting air cylinder 31, the detailed structure of which is not shown. After the tools 29 have been moved downwardly to swage or spread the upper ends of the hollow terminals, to thus secure them to the base 25, and the tools have again moved upwardly, the assembled structure, namely the base with its set of terminals, is ejected from the chuck 20 by ejector 90 (Fig. 9) and removed from the apparatus by suitable means (not shown).

Specifically, the apparatus includes a main frame 33 of the necessary contour for supporting the various other structures of the apparatus. Guides 34 and 35 are mounted upon a portion of the frame 33, to respectively support racks 36 and 37 for longitudinal movement. A pinion 38, interposed between the racks 36 and 37 in interengagement therewith, is rotatably carried, as at 39, by a rod 40 of an air cylinder 41. The air cylinder 41 is of the automatically operable double-acting type, the details of which are not shown. The rack 36 (Figs. 1 and 2) interengages a pinion 43, free to rotate in either direction, of a one-direction clutch 44, the member 47 thereof being axially movably connected, as at 45, to a vertical shaft 46. By "one-direction clutch" it is meant that the shaft 46 be rotated in one direction only, the driving pinion and the integral portion of the clutch 44 being movable relative to the member 47 during the return movement of the rack 36.

The shaft 46 is journalled in bearings 48 and 49, which are disposed in spaced parallel portions 50 and 51 of the frame 33. The upper portion of the shaft 46 is formed for the mounting of the locating element 12 upon the upper end thereof or any other locating element such as indicated at 53 in Fig. 6. The element 12 mounted upon the upper end of the shaft 46 is rotatably disposed in a hollow guide 55 (Figs. 2, 3 and 4) which is open, at 56, in alignment with the chute 11 to receive the terminals 10 singly from the chute. Thus the guide 55 cooperates with the chute in feeding terminals singly to the pockets 14 of the locating element 12 and holds the terminals in these pockets until they are removed by one of the chucks 16.

Figure 2:
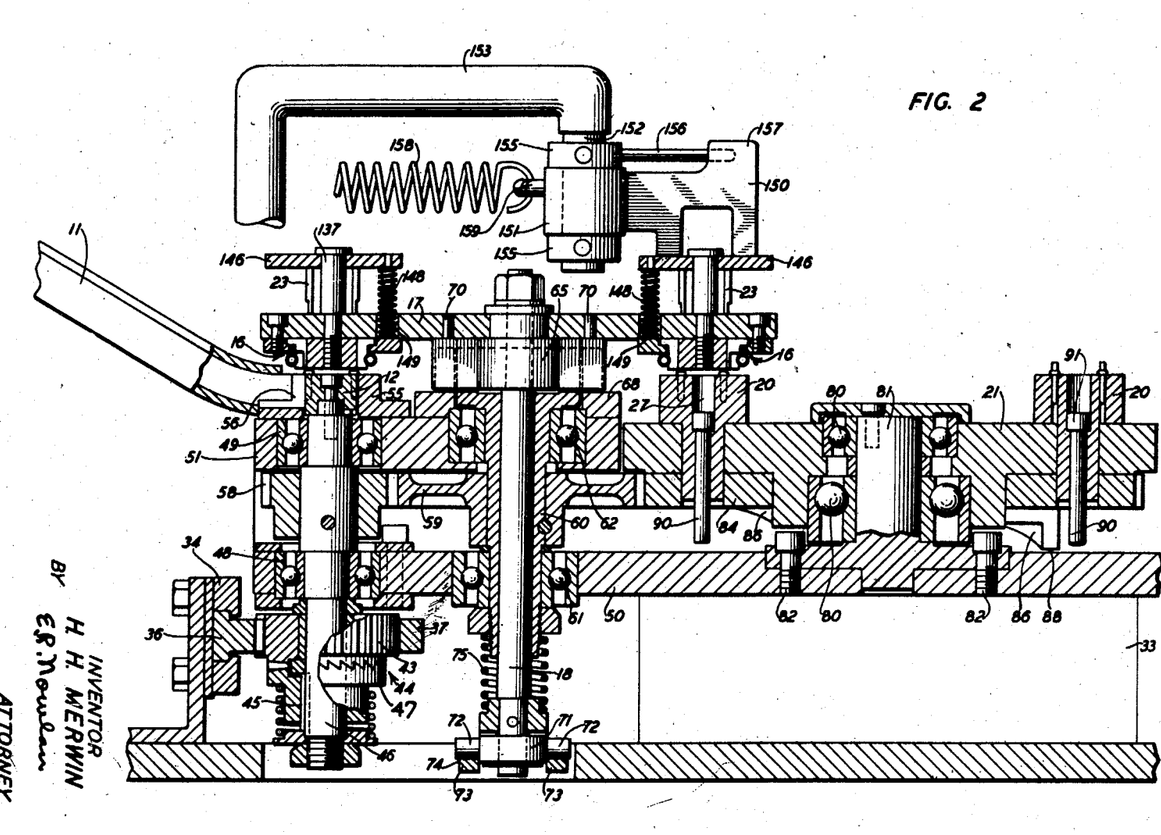
Fig. 2 is a vertical sectional view of the apparatus taken substantially along the line 2—2 of Fig. 1.

A gear 58 is mounted upon the shaft 46 between the frame portions 50 and 51 and interengages a gear 59 which is mounted upon a hollow shaft 60. The hollow shaft 60, like the shaft 46, is mounted in suitable bearings 61 and 62 of the frame portions 50 and 51. The upper portion of the hollow shaft 60 is cup-shaped, as at 63, with diametrically opposed notches 64 therein. A locking element 65, of the cross-sectional contour shown in Fig. 4 and otherwise illustrated in Figs. 2 and 3, is receivable in the cup-shaped portion 63 of the hollow shaft 60 and has projections 66 which are receivable in the notches 64. The projections 66 are also receivable in slots 67 of a locating member 68, the latter being fixedly mounted upon the frame portion 51. The portion of the locating member 68 in which the slots 67 are disposed terminates short of the upper end of the shaft 60 or cup-shaped portion 63 thereof in which the notches 64 are disposed. The purpose of this structure is to permit vertical movement of the element 65 in the shaft 60 and the cup-shaped portion thereof, so that the projecting portions 66 may be removed from their slots 67 but will at all times be operatively connected to the shaft 60 through its cup-shaped portion 63, as the projecting portion 66 will at all times be disposed in portions of the notches 64.

Figures 7, 8:
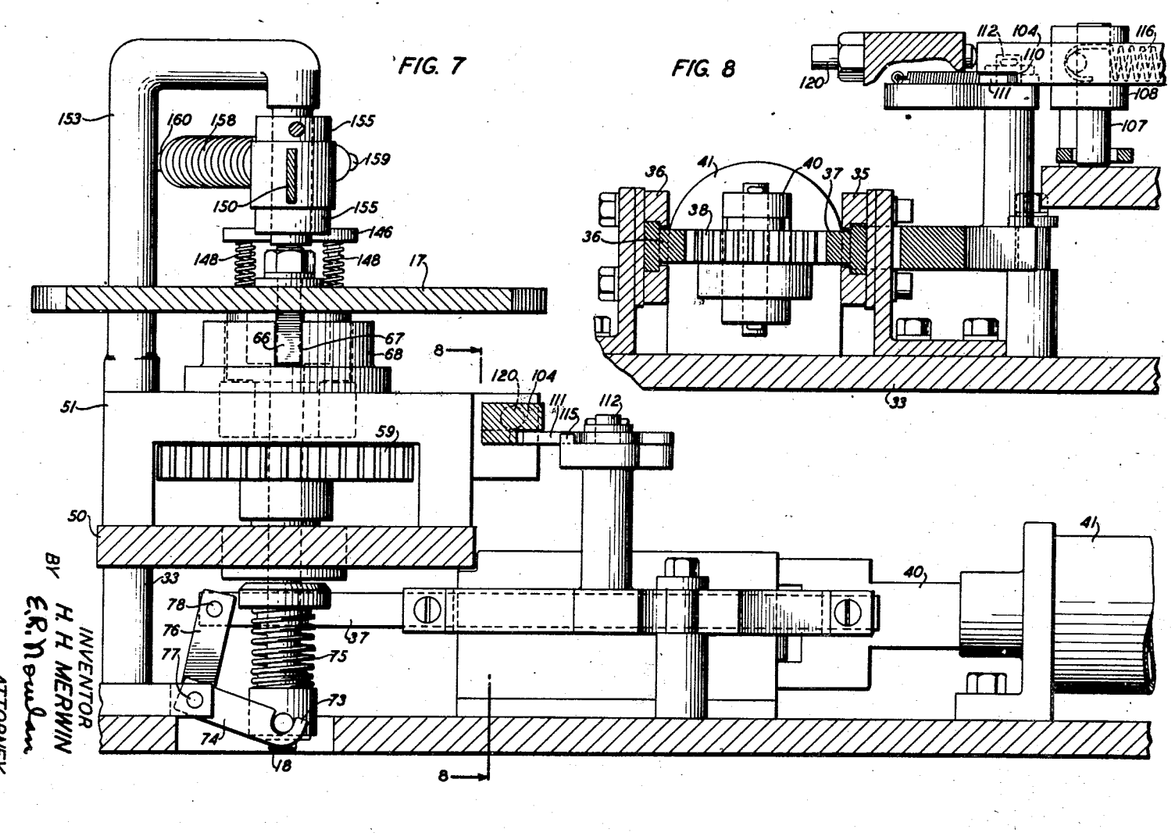
Fig. 7 is a fragmentary vertical sectional view taken substantially along the line 7—7 of Fig. 1.
Fig. 8 is a fragmentary sectional view taken along the line 8—8 of Fig. 1.

The element 65, as illustrated in Figs. 2 and 3, is fixedly mounted upon the supporting rod 18, and is also secured, through the aid of pins 70, to the transfer arm 17. The supporting rod 18 is axially movable in the hollow shaft 60 and is rotatable in a connecting member 71 at its lower end. The member 71 has trunnions 72 at diametrically opposed positions which are engaged by forked ends 73 (Figs. 2 and 7) of a lever 74 (Figs. 1, 2 and 7). A compression spring 75, disposed concentric with the supporting rod 18, normally urges the rod downwardly. Means operatively connecting the lever 74 with the rack 37 completes the actuable means for moving the supporting rod 18 upwardly. This means includes a lever 76 which is fixed at one end to a shaft 77, which supports the lever 74, and is fixed thereto. The upper end of the lever 76 is pivotally connected, as at 78, to the rack 37 and is movable therewith.

The dial 21 (Figs. 1, 2 and 9) is rotatably supported by bearings 80 on a spindle 81 which is fixedly mounted, as at 82, upon the portion 50 of the frame 33. An annular gear 84, mounted upon the under portion of the dial 21, interengages the gear 59 and is rotated one-quarter of a revolution during each half revolution of the gear 59. There are four cams 86 (Fig. 1) mounted on the gear 84 beneath the dial 21 and disposed at equally spaced positions with low portions 87 positioned farthest away from their respective chucks 20 and high portions 88 terminating adjacent their chucks. Knockout pins 90 are movably disposed in the chucks 20, as illustrated in Figs. 2 and 9, their upper head portions 91 being disposed a short distance beneath the stem 26 of each base 25 when disposed in the chuck 20 thereof. An ejecting trigger 93, pivotally supported at 94 in a bracket 95, which is fixed to the portion 50 of the frame 33, is of the general contour illustrated in Figs. 10 and 11, with a recessed portion 96 to receive a compression spring 97 which normally urges the latch upwardly or counterclockwise (Fig. 10) about its pivot. An integral laterally projecting lug 98 is positioned to be engaged by the cams 86 as they successively move with the dial 21 and gear 84 during rotation thereof. The cams, in engaging the lug 98, beginning at the low portions 87 and continuing until the high portion 88 passes beyond the lug 98, move the trigger from the dot and dash line position shown in Fig. 10 to the solid line position shown therein, after which the trigger is released, allowing the full force of the spring 97 to move the trigger 93 to cause the forward end thereof to move the adjacent ejecting pin 90 upwardly and force the completed structure out of its chuck 20. The portion 50 of the frame 33 is cut away, as at 100, to allow for the complete movement of the trigger 93.

Attention is directed to the general contour of the dial 21 in Fig. 1. It will be noted that projections 101 of the dial provide abutting shoulders 102 and 103 adjacent each chuck 20. These shoulders are adapted to be engaged at the finishing position of the dial by latches 104 and 105, respectively. The latch 104 is pivotally supported, at 107, by a link 108, the opposite end of the link being pivotally supported at 109. A portion of the latch 104 has a projection 110 positioned to be engaged by a catch 111 pivotally supported at 112. The catch 111 is normally urged, by the aid of a spring 114, into engagement with a stop 115 or into engagement with the projection 110 of the latch 104. By supporting the latch 104 through the aid of the link or lever 108, the latch is allowed to float about the pivot 109 between given limits. A spring 116, having one end fixed to a post 117 and the other end connected to the latch 104 as at 118, normally urges the latch clockwise about its pivot 109 and counterclockwise about the pivot 109. A variable stop 120, positioned to be engaged by the adjacent end of the latch 104, limits the movement of the latch in a clockwise direction about its pivot 109, to serve in locating the dial 21 at a given position during each quarter of a revolution thereof. The latch 105, engaging the opposite shoulder 103 of the projection 101, cooperates with the latch 104 in locking the dial in position. A spring 121, having one end fixed as at 122 to the latch 105 and the other end fixed to the post 117, normally urges the latch about its pivot 123. An adjustable screw 124, carried by the latch 105, is positioned to actuate a valve 125, which serves to start operation of the air cylinder means 31 for the forming operation through the aid of the tools 29 (Fig. 9).

The pivot 112 for the catch member 111 is carried by a bracket 128 which in turn is fixedly supported, as at 129, upon rack 37 and is thus movable with the rack. A cutaway portion 130 of the bracket 128 conditions the bracket to straddle the guide 35 during the reciprocation of the rack.

Attention is now directed to the transfer arm 17, particularly the chucks 16 thereof. The chucks 16 include fixed central portions 135 supported by threaded ends 136 of pins 137. The portions 135 have a plurality of pockets 138 disposed at spaced positions in the periphery thereof, to receive the terminals 10, that is, the upper portions thereof. Retaining annular members 140 are fixed to the transfer arm 17 concentric with the central portions 135 and are grooved, as at 141, to receive groups of segments 142. One of the segments 143, of each chuck, is fixed against movement, while all of the other segments are movable toward and away from the central portion to cooperate therewith in gripping the outer ends of the terminals 10. The force applied to the segments 142 to cause them to grip the terminals is supplied through the aid of a circular or garter spring 144.

The ejecting pins 23 are carried by heads 146 for each of the chucks 16, these heads being centrally apertured for mounting upon the pins 137, limited in their upward movement thereon through the aid of heads 147 of the pins. Springs 148, partially housed in apertures 149 of the transfer arm 17, as illustrated in Fig. 2, normally urge the heads 146 upwardly with the ejecting pins 23, to normally hold the latter, as illustrated at the left (Fig. 3), free of the terminals.

The ejecting pins 23 for each of the chucks 16 have been described as being capable of urging the terminals free of the chucks 16 and causing them to remain in the apertures 22 of the chucks 20. The means to bring about this result includes a forked arm 150 formed to straddle the pins 137 of each chuck 16, as illustrated in Figs. 2 and 3. The arm 150 has an integral collar 151 rotatably disposed upon a shank 152 of a bracket 153. The bracket 153 is supported in any suitable manner by the portion 51 of the frame 33, as illustrated in Fig. 7. Collars 155 are mounted upon the shank 152 upon each side of the collar 151 and pinned to the shank. A stop 156 is carried by the upper collar 155 and is positioned to be engaged by a projection 157 of the arm 150, to locate the latter above the transfer position, namely that position where the chucks 16 are vertically aligned with chucks 20 of the dial 21, for the transferring of the terminals from one of the transfer chucks to one of the assembling chucks. A spring 158, having one end connected to a lug 159 integral with the collar 151 and the other end fixed in any suitable manner, as indicated at 160, to the bracket 153 (Figs. 1 and 7), normally urges the arm 150 toward its stop 156.

Figure 12:
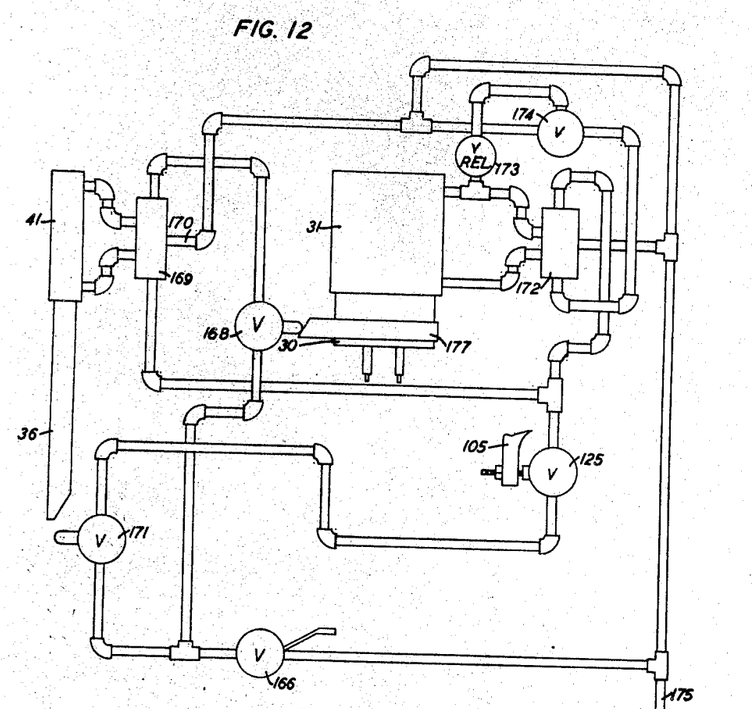
Fig. 12 is a schematic illustration of the air control system for the apparatus.
Figure 13:
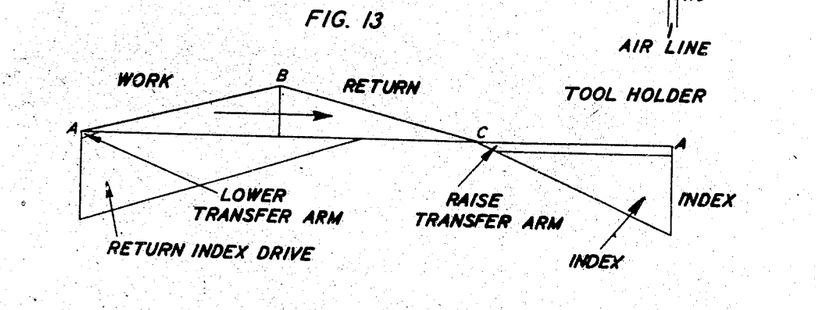
Fig. 13 is a chart illustrating the operating cycle of the apparatus.

The air control system for the apparatus is shown in Fig. 12. In this system the main air supply line is indicated at 175 and in the present instance the apparatus is under the control of a foot valve 166. As long as the foot valve 175 is held open, the apparatus will continue to operate automatically. With the tool holder 30 in its upper position, as shown, a cam 177 carried thereby has opened a valve 168 to open a line to the top of an air operated piston type valve 169. The valve 169 is moved to open communication between an air line 170 and the top of the air cylinder 41. This will cause indexing of the apparatus and at the end of the indexing stroke, a valve 171 is opened by the rack 36 or any suitable means movable therewith. At the completion of the indexing operation, the latches 104 and 105 are moved into their respective latching positions, the latch 105 causing opening of the valve 125. The opening of the valve 125 causes downward operation of a piston type valve 172 to open a line to the top of the cylinder 31. The tool holder 30 will move downwardly to perform the working operation and at the beginning of the downward stroke, the valve 168 is allowed to close. Closure of the valve 168 and opening of the valve 125 will cause reversal of the valve 169 to move the racks 36 and 37 to their starting positions. After the tools 29 engage the terminals and begin the forming operations, the air pressure at the top of the air cylinder will build up causing a relief valve 173 to operate and effect the opening of a valve 174. Opening of the valve 174 will cause shifting of the valve 172 to direct air under pressure to the bottom of the cylinder 31 to move the tool holder to its top position. When this has been accomplished, the valve 168 is opened and the operation continues as long as the foot valve remains open. A more complete understanding of the operating cycle may be had by viewing Fig. 13.

Upon considering the operation of the apparatus more in detail, let it be assumed that the cycle of operation begins with the various parts in the positions shown in Figs. 1 and 2. With a suitable supply of terminals in the chute 11, the locating element 12, during a previous cycle of operation of the apparatus, has become filled with the terminals and the chuck 16, disposed adjacent thereto, has been lowered to grip the terminals in readiness to remove them from the element 12. Furthermore, the terminals carried by the chuck 16 at the transfer position have been moved downwardly into the apertures of the adjacent chuck 20 and the arm 150 is positioned above the ejecting head 146. Let it be assumed that at this time, through the air control system previously described, air under pressure is caused to operate the air cylinder 41 to cause movement outwardly of the rod 40, to move with it the pinion 38. At this time the rack 36 cannot be moved due to the fact that it is locked against movement through a chain of mechanism leading from the rack 36 through the pinion 43, the gears 58, 59 and 84, to the dial 21, which is held against movement by the latches 104 and 105. Therefore, the first power derived from the pinion 38 actuates the rack 37 (Figs. 1, 2 and 7) to actuate the levers 76 and 74 to move the supporting rod 18 upwardly against the force of its spring 75 to move the transfer arm 17 upwardly until the projecting portions 66 of the element 65 become unlatched or disconnected from the fixed member 68 by being moved out of the slots 67 thereof. During this upward movement of the transfer arm 17, the terminals at the loading position are removed in the adjacent chuck 16 from the locating element 12 and the chuck 16 adjacent the transfer position is moved relative to the ejecting pins 23, the latter being held against upward movement by the arm 150 resting upon the head 146. Thus, as the latter chuck 16 is moved upwardly, the terminals 10 are prevented from rising therewith and thereby in effect forced therefrom by the ejecting pins, as illustrated at the right (Fig. 3).

The moment the transfer arm 17 is moved upwardly a sufficient distance to become free of the member 68 for rotation with the shaft 60, further movement of the rack 37 is terminated by the compression of the spring 75 (Fig. 2) and the continued power applied to the pinion 38 is transferred to the rack 36, which at that time is free to move due to the fact that the previous movement of the rack 37 has released the latch 104. The latch 104 is released by the catch 111 in its movement with the rack 37 engaging the projection 110, to move the latch 104 about its pivot 107 to free the end therefrom from engagement with the adjacent shoulder 102 of the projection 101 of the dial 21. The moment the latch 104 is released from the dial, the spring 116 pulls the latch a given distance away from the catch 111 to cause it to be positioned upon the periphery of the adjacent projection 101. Here it remains riding upon the periphery of the dial 21 during the next quarter cycle thereof, until the next shoulder 102 of the successively adjacent projection 101 is brought into engagement therewith and the latch 104 moved about its pivot 109 until its opposite end abuts the stop 120 and the catch 111 is moved about its pivot 112. At this time the engaging end of the latch 105, which has been held in engagement with the periphery of the dial 21, is brought into place behind the projection 101 to engage the shoulder 103 thereof.

Returning to the rack 36, beginning with the moment the rack receives movement from its driving element, the pinion 38, the rack will rotate the member 47 of the one-direction clutch 44, and therefore the shaft 46, one complete revolution, to thus rotate the positioning element 12 to cause it to receive, from the chute 11, a complete supply of terminals 10. The terminals will move by the force of gravity into the pockets 14, as they are singly presented to the chute, or to the opening 56 in the guide 55, during the rotation of the shaft 46 one revolution. During the loading of the element 12, the rotation of the shaft 46 causes the transfer arm 17 to rotate the newly loaded chuck 16 to the transfer position and the empty chuck 16 to the loading position. During this movement or half cycle of the transfer arm 17, the latter is in its upper position, and at a position where the ejecting head 146 of the chuck 16 approaching the transfer position will engage the ejecting arm 150 and move it about the shank 152 against the force of the spring 158. This structure, the two arms 17 and 150, will remain in this position until the transfer arm is again lowered. However, attention at this time is directed to the dial 21, which has been freed by the releasing of the latch 104. During the rotation of the shafts 46 and 60 with their gears 58 and 59, the dial 21 is rotated the distance of one station, that is, one-quarter of a revolution, to move the chuck 20, which has previously received the set of terminals, to the forward position, where the operator may place the article or base 25 thereon.

At the end of this half cycle, that is, at the end of the movement of the rod 40 of the air cylinder 41 (Fig. 1) in one direction terminated by the latch 104 engaging the next successive shoulder 102 on its projection 101, the rod 40 is moved in the opposite direction, by the air cylinder 41, to first move the rack 37 to its starting position, moving the shoulder of the catch 111 past the projection 110, to position it in readiness for the next operation and, at the same time, cause lowering of the supporting rod 18 assisted by the spring 75, after which the rack 36 is returned to its starting position. During the lowering of the supporting rod 18, the transfer arm 17 is moved downwardly by the projection 66 entering the adjacent slots 67 of the member 68, to cause the chuck 16 at the loading position to receive the upper ends of the terminals in the positioning element 12 and the other chuck 16, at the ejecting position, to position its terminals in the adjacent chuck 20. As the transfer arm 17 reaches its lowermost position, the arm 150, which has been held in its moved position away from the stop 156 by the ejecting head 146, is free to move over the head and against its stop, to be in readiness to cause ejection of the terminals from the adjacent chuck 16 during the next upward movement of the transfer arm. Attention at this point is again directed to Fig. 13.

Returning again to the dial 21, it should be understood that during the operation of the apparatus each of the chucks 20 will be filled with the sets of terminals except during their travel from the ejecting position, until they receive the new set of terminals at the loading or transfer position. When the chucks 20 reach the final position as shown in Fig. 9, with the base 25 in place and the upper hollow ends of the terminals projecting through apertures in the bottom portion thereof, the tools 29 are independently brought downwardly, as previously described (see Fig. 12), so that their leading central ends 165 will enter the terminals and their outer portions will engage the upper edges of the terminals and roll them outwardly to rivet or thus secure the terminals to the base. The tools 29, through the action of the air cylinder 31, are moved upwardly free of the article before the next movement of the dial 21.

By viewing Fig. 1, it will be noted that the trigger 93 is being compressed or forced downwardly against its spring 97, and after the high portion of the cam, engaging its projection 98, is moved free of the projection, the forward portion of the trigger will be located, as illustrated in Fig. 10, beneath the ejecting pin 90 and will move the pin upwardly with sufficient force to eject the completed article with its attached terminals from the chuck.

Figure 6:
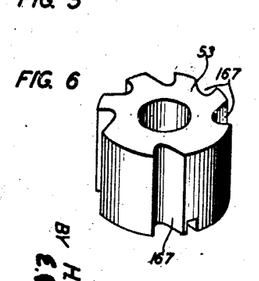
Fig. 6 is a perspective view of one of a plurality of locating elements which may be used in the apparatus.

As previously described, the apparatus illustrates the locating element 12 and the various chucks to receive sets of eight terminals. These may be varied depending upon the arrangement of terminals desired, and as an illustration Fig. 6 shows the locating element 53 with pockets 167 to receive, in a special arrangement, six terminals.

Although specific improvements of the invention have been shown and described, it will be understood that they are but illustrative and that various modifications may be made therein without departing from the scope and spirit of this invention as defined by the appended claims.

What is claimed is:

1. In an assembling apparatus, means to supply terminals, an element rotatable relative to the supply means formed to successively receive groups of the terminals therefrom and maintain them in a given spacing, a dial rotatable intermittently relative to a receiving station, holders for successively receiving the groups of terminals in the given spacing, carried by the dial, a transfer unit, means to move the unit relative to the element to cause the unit to remove the group of terminals therefrom, and means to rotate the unit a given distance to transfer the said group of terminals to the receiving station.

2. In an assembling apparatus, means to supply terminals, an element rotatable relative to the supply means formed to successively receive groups of the terminals therefrom and maintain them in a given spacing, a dial rotatable intermittently relative to a receiving station, holders for successively receiving the groups of terminals in the given spacing, carried by the dial, a transfer unit, means to move the unit relative to the element to cause the unit to remove the group of terminals therefrom, and means to rotate the unit a given distance to transfer the said group of terminals to the receiving station, the said moving means causing the unit to position the said group of terminals in one of the holders.

3. In an assembling apparatus, means to supply terminals, an element rotatable relative to the supply means formed to successively receive groups of the terminals therefrom and maintain them in a given spacing, a dial rotatable intermittently relative to a receiving station, holders for successively receiving the groups of terminals in the given spacing, carried by the dial, a transfer unit, means to move the unit relative to the element to cause the unit to remove the group of terminals therefrom, and means to rotate the unit a given distance to transfer the said group of terminals to the receiving station, the said moving means causing the unit to position the said group of terminals in one of the holders and remove another group of terminals from the element.

4. In an assembling apparatus, means to supply terminals, an element rotatable relative to the supply means formed to successively receive groups of the terminals therefrom and maintain them in a given spacing, a dial rotatable intermittently relative to a receiving station, holders for successively receiving the groups of terminals in the given spacing, carried by the dial, a transfer unit, means to move the unit relative to the element to cause the unit to remove the group of terminals therefrom, and means to cause rotation of the element and unit given distances, the rotation of the unit being between the element and the receiving station.

5. In an assembling apparatus, means to supply terminals, an element rotatable relative to the supply means formed to successively receive groups of the terminals therefrom and maintain them in a given spacing, a dial rotatable intermittently relative to a receiving station, holders for successively receiving the groups of terminals in the given spacing, carried by the dial, a unit actuable to successively remove the groups of terminals from the element and transfer them to the holders, and power means operatively connected to the element and unit to cause rotation of the former and actuation of the latter in a given order.

6. In an assembling apparatus, a transfer unit having spaced chucks, means to supply of terminals, an element rotatable relative to the supply means formed to successively receive groups of the terminals therefrom and maintain them in a given spacing, holders successively movable relative to a receiving station, means actuable to reciprocate the unit to cause the chucks to alternately remove the groups of terminals from the element and position them in the successive holders, and intermediately actuable means to rotate the unit given distances to alternately move the chucks between the element and the receiving station.

7. In an assembling apparatus, a transfer unit having spaced chucks, means to supply of terminals, an element rotatable relative to the supply means formed to successively receive groups of the terminals therefrom and maintain them in a given spacing, holders successively movable relative to a receiving station, means actuable to reciprocate the unit to cause the chucks to alternately remove the groups of terminals from the element and position them in the successive holders, intermediately actuable means to rotate the unit given distances to alternately move the chucks between the element and the receiving station, and power means to actuate both the said actuable means.

8. In an assembling apparatus, a transfer unit having spaced chucks, means to supply of terminals, an element rotatable relative to the supply means formed to successively receive groups of the terminals therefrom and maintain them in a given spacing, holders successively movable relative to a receiving station, means actuable to reciprocate the unit to cause the chucks to alternately remove the groups of terminals from the element and position them in the successive holders, intermediately actuable means to rotate the unit given distances to alternately move the chucks between the element and the receiving station, and power means to actuate both the said actuable means and rotate the element.

9. In an assembling apparatus, a transfer unit having spaced chucks, means to supply of terminals, an element rotatable relative to the supply means formed to successively receive groups of the terminals therefrom and maintain them in a given spacing, holders successively movable relative to a receiving station, means actuable to reciprocate the unit to cause the chucks to alternately remove the groups of terminals from the element and position them in the successive holders, intermediately actuable means to rotate the unit given distances to alternately move the chucks between the element and the receiving station, and means to hold the unit against rotation during its reciprocable movement.

HARRY H. MERWIN.

REFERENCES CITED

The following references are of record in the file of this patent:

(Other references on following page)

UNITED STATES PATENTS

| Number | Name | Date |
|---|---|---|
| 1,783,706 | Ferguson | Dec. 2, 1930 |
| 2,319,232 | Holmes et al. | May 18, 1943 |
| 2,172,145 | Rehnberg | Sept. 5, 1939 |
| 379,330 | Raymond | Mar. 13, 1888 |
| 317,199 | Raymond | May 5, 1885 |
| 694,656 | Mayo | Mar. 4, 1902 |
| 1,979,434 | Baker et al. | Nov. 6, 1934 |
| 2,015,033 | Hayden | Sept. 17, 1935 |
| 1,941,992 | Makenny | Jan. 2, 1934 |
| 1,871,382 | Meyer | Aug. 9, 1932 |